United States Patent
Fair et al.

(10) Patent No.: US 7,409,522 B1
(45) Date of Patent: Aug. 5, 2008

(54) METHOD AND SYSTEM FOR REALLOCATING DATA IN A FILE SYSTEM

(75) Inventors: Robert L. Fair, Cary, NC (US); John K. Edwards, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 463 days.

(21) Appl. No.: 11/260,534

(22) Filed: Oct. 26, 2005

(51) Int. Cl.
*G06F 12/00* (2006.01)

(52) U.S. Cl. .................. 711/170; 711/111; 711/112; 711/114; 711/156; 711/158; 711/165; 707/204

(58) Field of Classification Search .................. 711/170, 711/111, 112, 114, 156, 158, 165; 707/204
See application file for complete search history.

(56) References Cited

U.S. PATENT DOCUMENTS

| | | | | |
|---|---|---|---|---|
| 6,038,636 | A * | 3/2000 | Brown et al. ................. | 711/103 |
| 6,442,461 | B2 * | 8/2002 | Matsuo ......................... | 701/35 |
| 6,496,913 | B1 * | 12/2002 | Taugher et al. ............... | 711/170 |
| 6,779,081 | B2 * | 8/2004 | Arakawa et al. ............. | 711/112 |
| 6,978,283 | B1 * | 12/2005 | Edwards et al. ............. | 707/206 |
| 7,181,585 | B2 * | 2/2007 | Abrashkevich et al. ...... | 711/170 |
| 2001/0016792 | A1 * | 8/2001 | Matsuo ......................... | 701/35 |
| 2004/0120007 | A1 * | 6/2004 | Jacobsen et al. ............ | 358/1.16 |
| 2004/0148476 | A1 * | 7/2004 | Altare ......................... | 711/159 |
| 2005/0166025 | A1 * | 7/2005 | Wong et al. .................. | 711/165 |
| 2005/0187985 | A1 * | 8/2005 | Edwards et al. ............. | 707/200 |
| 2005/0228963 | A1 * | 10/2005 | Rothman et al. ............. | 711/170 |

* cited by examiner

*Primary Examiner*—Stephen C Elmore
(74) *Attorney, Agent, or Firm*—Blakely, Sokoloff, Taylor & Zafman LLP

(57) ABSTRACT

A method and system for reallocating the data blocks of a logical data entity are described. According to one aspect of the invention, the physical arrangement of data blocks of a logical data entity are analyzed to determine a fragmentation level. Next the fragmentation level is compared with a fragmentation threshold previously assigned to the logical data entity. If the fragmentation level exceeds the fragmentation threshold, only those data blocks of the logical data entity that are within a predefined allocation area having a predetermined number of contiguous data blocks that are not associated with the logical data entity are reallocated.

17 Claims, 10 Drawing Sheets

METHOD AND SYSTEM FOR REALLOCATING DATA IN A FILE SYSTEM

FIELD OF THE INVENTION

The present invention relates generally to network-based storage systems, and in particular, to a method and system for reallocating data blocks of a logical data container, such as a file, volume or LUN, in an active file system of a network-based storage system with write anywhere capabilities.

BACKGROUND

In a typical modern file system, when a file is initially written to a disk or other mass storage device, the file is divided into equally-sized, logical data blocks, and an attempt is made to write the logical data blocks sequentially and contiguously to the disk or mass storage device. Consequently, when the file is read from the disk or mass storage device, the individual data blocks can be read sequentially, thereby limiting the number of read operations required, which in turn limits the seek time required by the reading component (e.g., disk drive head) to search for and locate the individual data blocks comprising the file. However, over time, as existing files are modified and deleted, and new files are written, the availability of physical contiguous space for writing new files becomes limited. Consequently, files tend to become fragmented. When the files of a file system become fragmented, multiple read operations are required to read the files, and the overall performance of the system suffers.

For a variety of reasons, fragmentation issues may arise with network-based storage systems that implement write anywhere file systems, such as the WAFL® (Write Anywhere File Layout) file system developed by Network Appliance of Sunnyvale, Calif.). Storage systems having file systems with write anywhere capabilities differ from storage systems with more traditional file systems in several respects. First, the write allocation policy of a write anywhere file system is extremely flexible when compared to many traditional file systems. Consequently, the data and/or metadata that make up a particular logical data container (e.g., a file, volume, or LUN) may be written to any location on any mass storage device. For example, when a storage system with a write anywhere file system is writing a file's individual logical data blocks to a disk, the storage system may write the data blocks to any location (e.g., disk blocks) on any disk connected to the storage system. Moreover, when a particular data block of an existing file is modified, the modified data block will not necessarily be written back to the same physical location (e.g., disk block) as the initial data block.

Consequently, with a write anywhere file system, certain classes of workloads are likely to endure performance degradation due to fragmentation issues. For instance, performance levels associated with workloads that are characterized by a large number of random writes followed by a sequential read tend to suffer from fragmentation issues. This may occur, for example, with workloads associated with certain database applications, such as Microsoft® Exchange Server™. For example, during a work day, a large file that makes up an individual user's email mailbox may be modified several times, causing the large file to become severely fragmented. At night, when a verification or backup process is performed on the mailbox file, an attempt is made to sequentially read the file. However, due to the fragmentation caused by the user's activity throughout the day, the system may have a difficult time sequentially reading the mailbox file. Accordingly, reading the fragmented mailbox file is accomplished via a greater number of read operations than would be necessary if the mailbox file was not fragmented.

With a storage system having a traditional file system, a defragmentation application is often utilized to improve the overall performance when the storage system is suffering from a badly fragmented file system. A typical defragmentation application analyzes a fragmented file system to identify files that are fragmented. After identifying a particular file that is fragmented, the defragmentation application attempts to read all of the data blocks comprising the particular file, and to re-write the data blocks to contiguous unallocated disk blocks of the disk or other mass storage device. Consequently, data blocks are physically rearranged. However, the defragmentation operation does not increase the number of allocated disk blocks. For example, for every new disk block allocated, a previously allocated disk block is unallocated and made available.

Traditional defragmentation applications may be ineffective when used with certain network-based storage systems that implement write anywhere file systems. In particular, the WAFL® file system has certain characteristics, which render traditional defragmentation tools less useful. One such characteristic is the ability to create "Snapshots™" when used in conjunction with tools such as SnapDrive™ or SnapManager® for Microsoft® Exchange, both made by Network Appliance, Inc. A Snapshot™ is a form of read-only, persistent, point-in-time image (PPI) of a particular data set, such as a volume, file system, or logical unit number (LUN). The term "Snapshot" is used herein without derogation of any trademark rights of Network Appliance, Inc.

In WAFL®, a file is structured as a tree (hierarchy) of blocks, where the upper level blocks contain meta-data pointing to the lower level blocks that store the actual data. During a Snapshot operation, rather than creating an entirely new tree of blocks to form the Snapshot, only the upper level blocks containing the meta-data are copied, and these copied upper level blocks point to the original lower-level (actual data) blocks. As data in the active file system is modified, the meta-data for the active file system is changed to point to new data blocks, whereas the Snapshot does not change.

FIG. 1 illustrates an example of what occurs during a Snapshot operation. The block labeled "AF" represents a meta-data block (e.g., an inode), for a file that is part of the active file system. The "AF" meta-data block contains meta-data including pointers to four data blocks, "A", "B", "C" and "D", which store the actual data that make up the file. When originally written to disk, the data blocks are written sequentially and contiguously. During a Snapshot operation, the "AF" meta-data block is copied, and a new meta-data block is created, for example, Snapshot meta-data block "SN1". The Snapshot meta-data block "SN1" includes pointers to the same data blocks (e.g., blocks "A" through "F"), because at that particular point in time (e.g., time=2), the file that is part of the active file system is the same as the file that was captured in the Snapshot operation.

At some later point in time (e.g., time=3), when the file is modified, rather than overwriting the disk block storing data block "C" with a new data block, a new disk block is allocated (e.g., the disk block storing data block "C*"). Accordingly, the pointer in the "AF" meta-data block is updated to point to the new data block "C*". However, because the data blocks that make up the Snapshot are read-only, the pointer in the Snapshot meta-data block "SN1" continues to point to the original data block "C". Consequently, the data blocks that make up the file in the active file system (e.g., the bold data blocks) become fragmented. However, because data blocks "SN1", "A", "B", "C" and "D" are part of the read-only Snapshot, those data blocks cannot be moved or rewritten. Therefore, to completely reorder the data blocks that make up the file in the active file system, data blocks "A", "B", and "D" need to be copied to a new location, while data block "C*" needs to be relocated. However, this would result in the addition of three new data blocks being allocated. Consequently, a traditional defragmentation application, which might move the data blocks of the active file system to a new location, would be ineffective because it would nearly double the number of allocated blocks.

Furthermore, in an environment with one or more network-based storage systems, there are often multiple file systems involved. For example, each client computer system configured to utilize a storage server may have its own local file system. For example, the local file system on the client may logically map a file's data to logical data blocks, e.g., file block numbers (FBNs). In addition, the storage server may have its own file system that manages the physical mapping of the data to physical storage units (e.g., disk blocks) on the mass storage device. The client's logical mapping of the data blocks will not necessarily coincide with the storage server's physical mapping of the data blocks. Consequently, a defragmentation application executed locally on the client may improve the logical mapping of the data blocks. However, by improving the logical arrangement, the locally executed defragmentation application may cause greater fragmentation of the data blocks as physically stored on the mass storage device. Consequently a defragmentation application executed locally on the client may actually make matters worse in certain instances.

SUMMARY OF THE DESCRIPTION

A method and system for reallocating data blocks of a logical data entity are provided. According to one aspect of the present invention, the physical arrangement of the data blocks of a logical data entity is analyzed to determine a fragmentation level associated with the logical data entity. If the fragmentation level exceeds a previously assigned fragmentation threshold associated with the logical data entity, then only those data blocks of the logical data entity that are within a predefined allocation area having a predetermined number of contiguous data blocks not associated with the logical data entity are reallocated.

Other aspects of the invention will be apparent from the accompanying figures and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
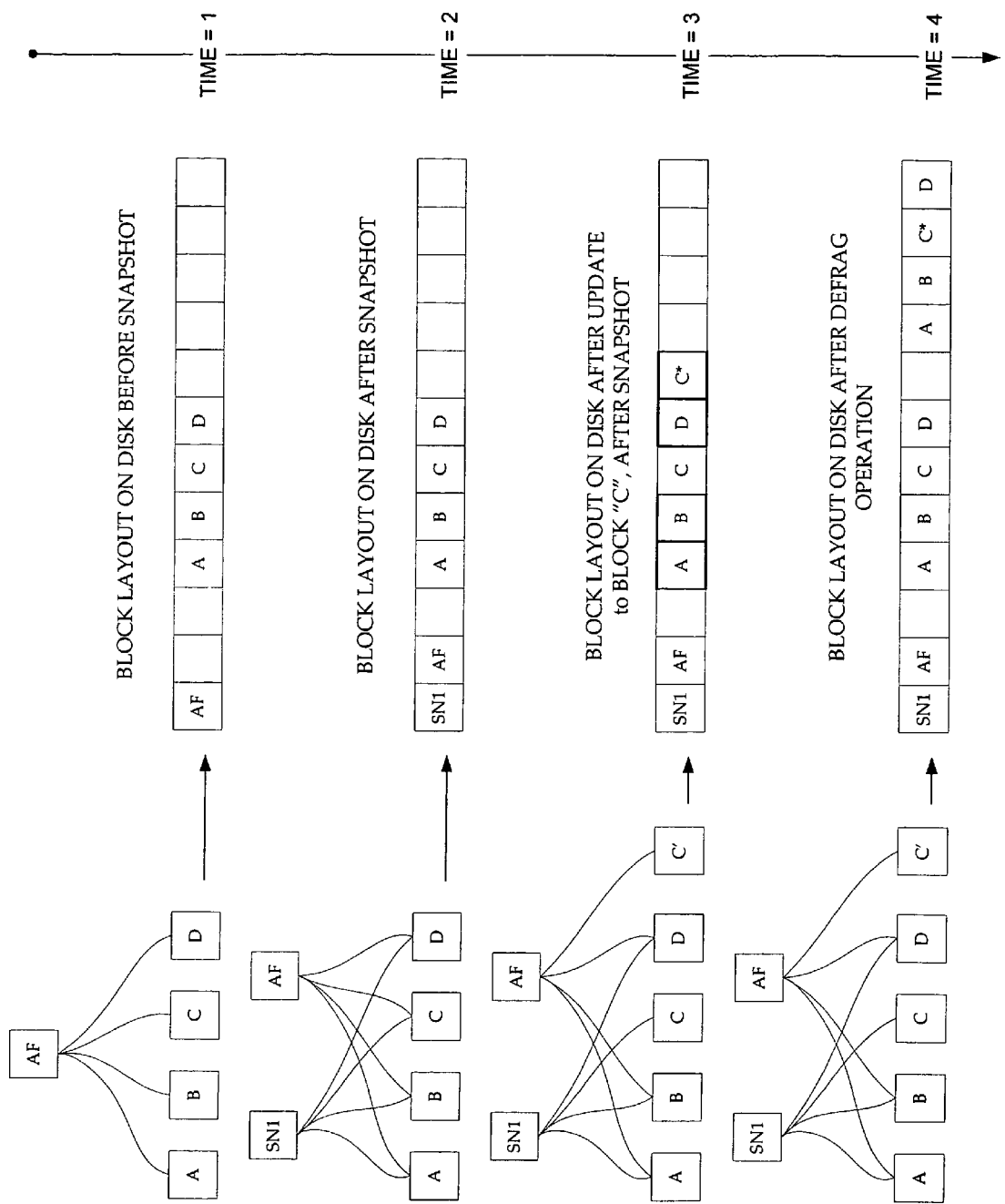
FIG. 1 illustrates an example of a Snapshot operation that may cause fragmentation of a file within the active file system.

A method and system for reallocating the data blocks of a logical data entity are described. In the following description, for purposes of explanation, numerous specific details are set forth in order to provide a thorough understanding of the present invention. It will be evident, however, to one skilled in the art that the present invention may be practiced without these specific details.

As described in greater detail below, in certain embodiments of the invention, a reallocation method includes analyzing the physical arrangement of the data blocks making up a particular logical data entity (e.g., a file, volume or logical unit number (LUN)) to determine a fragmentation level associated with the logical data entity. If the fragmentation level exceeds a fragmentation threshold that has previously been assigned to the logical data entity, then an attempt is made to physically rearrange the data blocks in order to reduce the overall level of fragmentation. Accordingly, at least one embodiment of the invention proceeds by scanning (e.g., measuring the fragmentation level), reallocating, and then re-scanning.

In the context of the present invention, a logical data entity is a construct implemented by a storage system for storing data in addressable groups of data blocks. For example, a logical data entity may include, but not necessarily be limited to: files, volumes and logical unit numbers (LUNs). To reduce the number of read operations necessary to read a particular logical data entity, and thereby increase the performance level of the storage system, it is generally desirable that the logical data blocks making up a particular data entity be stored on a physical medium such that the data blocks are arranged sequentially and contiguously.

In one embodiment of the invention, the reallocation method has multiple modes of operation. For example, depending on the mode of operation, the reallocation method may perform a sequence of operations to achieve a particular reallocation policy. In one mode of operation, the reallocation policy is aimed at limiting the level of divergence between data blocks associated with both an active data entity and an inactive data entity such as a read-only, persistent point-in-time image (PPI) (e.g., a Snapshot or the like). For example, a particular file may exist in both the active file system and a read-only PPI. Accordingly, the active file and the file associated with the PPI may share in common one or more spans of contiguous data blocks. By identifying, and then not reallocating, spans of contiguous data blocks, two things are accomplished. First, data blocks that are associated with both a PPI and an active data entity are potentially kept together with data blocks that belong only to the PPI. Second, physical storage space is preserved because data blocks are not duplicated. Assuming PPIs are read-only, the data blocks of a PPI cannot be reallocated. Consequently, reallocating a contiguous span of data blocks associated with both a PPI and an active data entity (e.g., a file) results in duplicating the data blocks in a new physical location, thereby doubling the amount of physical space allocated. By not reallocating contiguous spans of data blocks, needless duplication of data blocks is avoided.

In another mode of operation, the reallocation policy is aimed at distributing data blocks more evenly across a group of mass storage devices to improve overall performance of the storage system. For example, when a new RAID (redundant array of independent disks) group is added to an existing volume, the new mass storage devices of the new RAID group may initially have no data. Consequently, most of the input and output operations are directed to the existing mass storage devices, thereby negatively affecting the overall performance of the storage system. By reallocating the data across all of the mass storage devices assigned to the volume, the storage system performance is increased.

Multiple fragmentation thresholds can be used in a storage system. For example, each reallocation job (e.g., LUN, file or volume) can have its own independent fragmentation threshold. In certain embodiments of the invention, the fragmentation threshold associated with any particular logical data entity may be user-configurable via a user interface, such as a command line interface (CLI) or a graphical user interface (GUI). Moreover, the fragmentation threshold for a particular logical data entity may be set at the time the logical data entity is established or created, or alternatively, the threshold may be set or changed at a later time, after the logical data entity has been created. If no fragmentation threshold is assigned at the time a logical data entity is created, in one embodiment of the invention, a default fragmentation threshold may be assigned to the logical data entity.

In addition, for each logical data entity, the defragmentation algorithm can be scheduled to run at one or more specified times. Alternatively, the defragmentation algorithm can be scheduled to run continuously. In addition, a user may execute a command to inquire on the status of a particular defragmentation job, or all defragmentation jobs.

Figure 2:
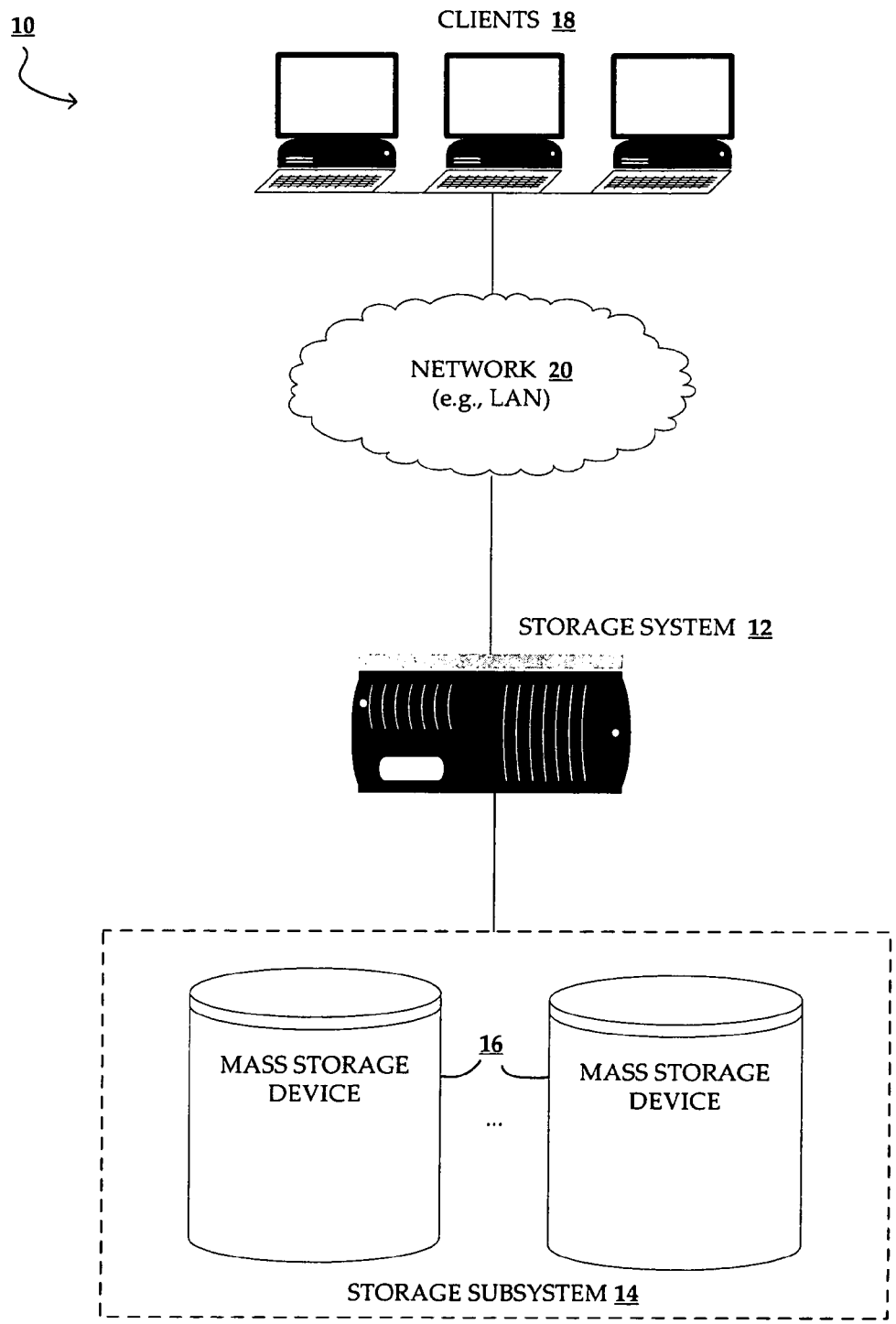
FIG. 2 illustrates an example of a network environment in which a storage system, consistent with an embodiment of the invention, might be utilized.

FIG. 2 illustrates an example of a network environment 10 in which a storage system 12, consistent with an embodiment of the invention, might be utilized. The storage system 12 may be, for example, a file server such as used in a network attached storage (NAS) configuration, a block-level server such as used in a storage area network (SAN), or a combination thereof. The storage system 12 illustrated in FIG. 2 is coupled locally to a storage subsystem 14, which includes a set of mass storage devices 16, and to a set of clients 18 through a network 20, such as a local area network (LAN). Each of the clients 18 may be, for example, a conventional personal computer (PC), workstation, or the like. The storage subsystem 14 is managed by the storage system 12.

The storage system 12 receives and responds to various read and write requests from the clients 18, directed to data stored in or to be stored in the storage subsystem 14. The clients 18 typically communicate with the storage system 12 by exchanging discrete frames or packets of data formatted according to predefined network communication protocols, such as Hypertext Transfer Protocol (HTTP) and Transmission Control Protocol/Internet Protocol (TCP/IP), as well as protocols such as Network File System (NFS) and/or Common Internet File System (CIFS). In this context, a protocol consists of a set of rules defining how the interconnected computer systems interact with one another. The mass storage devices 16 in the storage subsystem 14 may be, for example, conventional magnetic disks, optical disks such as CD-ROM or DVD based storage, magneto-optical (MO) storage, or any other type of non-volatile storage devices suitable for storing large quantities of data.

The storage system 12 may have a distributed architecture; for example, it may include a separate N- ("network") blade and D- (disk) blade (not shown). In such an embodiment, the N-blade is used to communicate with clients 18, while the D-blade includes the file system functionality and is used to communicate with the storage subsystem 14. The N-blade and D-blade communicate with each other using an internal protocol. Alternatively, the storage system 12 may have an integrated architecture, where the network and data components are all contained in a single box. The storage system 12 further may be coupled through a switching fabric to other similar storage systems (not shown) which have their own local storage subsystems. In this way, all of the storage subsystems can form a single storage pool, to which any client of any of the storage systems has access.

Figure 3:
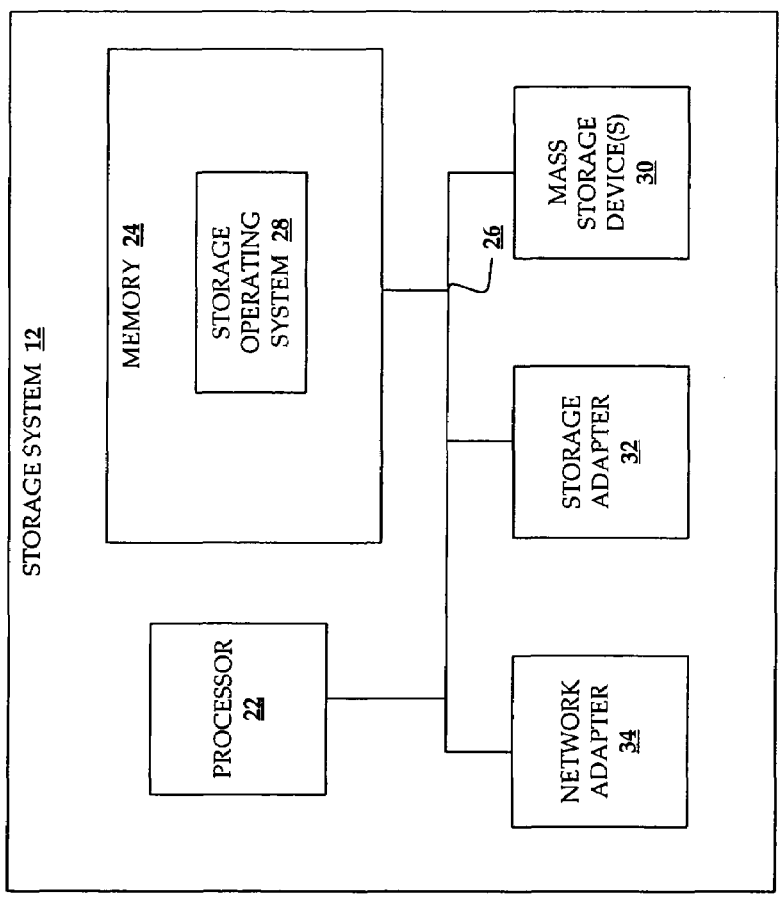
FIG. 3 is a block diagram illustrating the architecture of the storage system, according to certain embodiments of the invention.

FIG. 3 is a block diagram illustrating the architecture of the storage system 12, according to certain embodiments of the invention. Certain standard and well-known components which are not germane to the present invention may not be shown. The storage system 12 includes one or more processors 22 and memory 24 coupled to a bus system 26. The bus system 26 shown in FIG. 2 is an abstraction that represents any one or more separate physical buses and/or point-to-point connections, connected by appropriate bridges, adapters and/or controllers. The bus system 26, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 22 are the central processing units (CPUs) of the storage system 12 and, thus, control the overall operation of the storage system 12. In certain embodiments, the processor(s) 22 accomplish this by executing software stored in memory 24. The processor(s) 22 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 24 is or includes the main memory of the storage system 12. Memory 24 represents any form of random access memory (RAM), read-only memory (ROM), flash memory, or the like, or a combination of such devices. Memory 24 stores, among other things, the operating system 28 of the storage system 12, in which the reallocation techniques introduced above can be implemented.

Also connected to the processor(s) 22 through the bus system 26 are one or more internal mass storage devices 30, a storage adapter 32 and a network adapter 34. The internal mass storage device 30 may be or include any conventional medium for storing large volumes of data in a non-volatile manner, such as one or more magnetic or optical based disks. The storage adapter 32 allows the storage system 12 to access the storage subsystem 14 and may be, for example, a Fibre Channel adapter or a SCSI adapter. The network adapter 34 provides the storage system 12 with the ability to communicate with remote devices, such as the clients 18, over a network and may be, for example, an Ethernet adapter.

Figure 4:
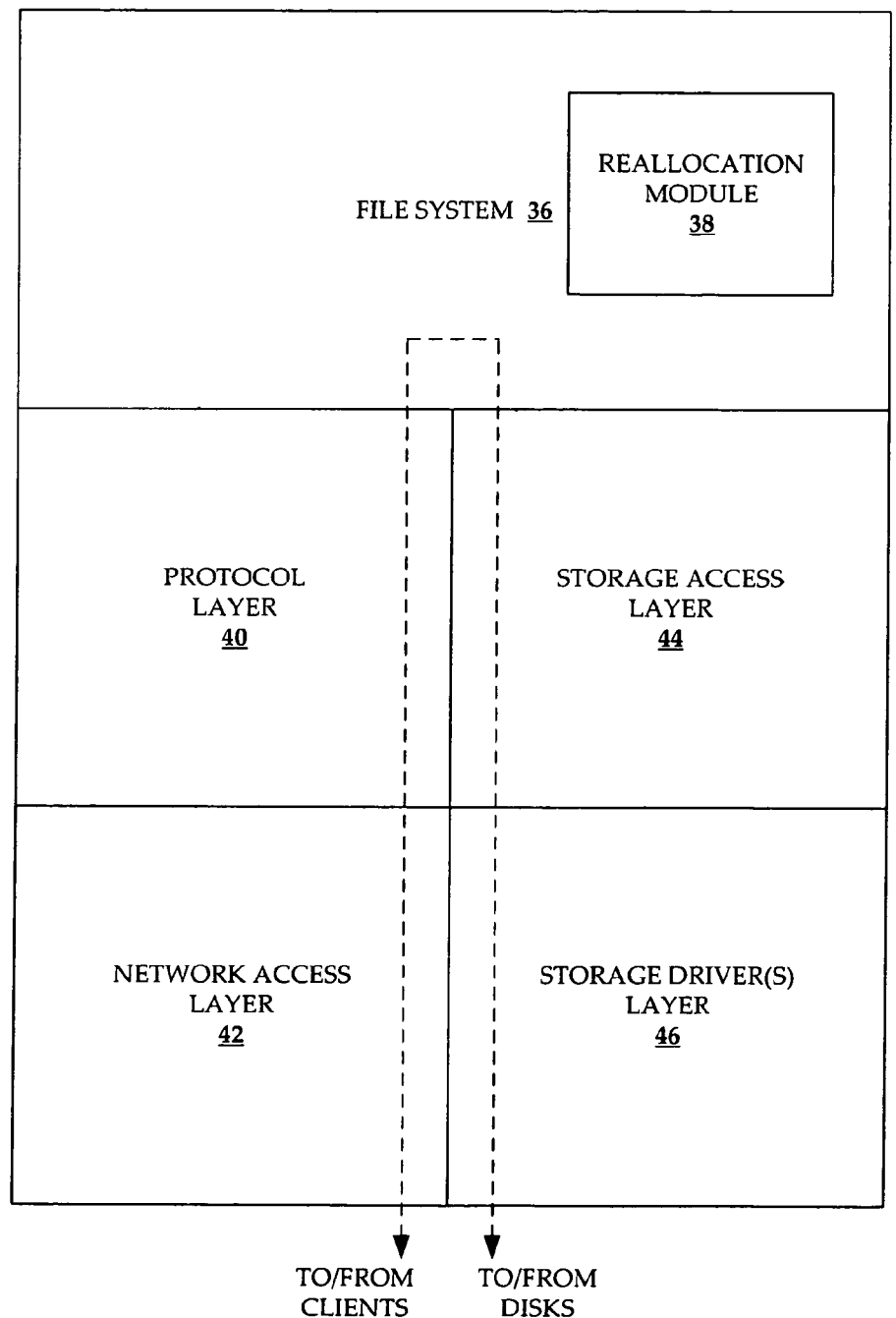
FIG. 4 illustrates an example of the operating system of the storage system, according to certain embodiments of the invention.

FIG. 4 illustrates an example of the operating system 28 of the storage system 12. As shown, the operating system 28 (which can be a form of the Data ONTAP® storage operating system made by Network Appliance, Inc.) includes several modules, or "layers". These layers include a file system 36 (which can be a form of the WAFL® file system made by Network Appliance, Inc.). The file system 36 is application-layer software that keeps track of the directory structure (hierarchy) and data stored in the storage subsystem 14 and manages read/write operations on the data (e.g., executes read/write operations on the disks in response to client requests). Reallocation module 38 operates within the file system 36 layer of the operating system. The reallocation module 36 performs the defragmentation operations described herein.

Logically "under" the file system 36, the operating system 28 also includes a protocol layer 40 and an associated network access layer 42, to allow the storage system 12 to communicate over the network 20 (e.g. with clients 18). The protocol layer 40 implements one or more various higher-level network protocols, such as NFS, CIFS, HTTP and/or TCP/IP. The network access layer 42 includes one or more drivers which implement one or more lower-level protocols to communicate over the network, such as Ethernet or Fibre Channel.

Also logically under the file system 36, the operating system 28 includes a storage access layer 44 and an associated storage driver layer 46, to allow the storage system 12 to communicate with the storage subsystem 14. The storage access layer 44 implements a higher-level disk storage protocol, such as RAID, while the storage driver layer 46 implements a lower-level storage device access protocol, such as Fibre Channel Protocol (FCP) or SCSI.

Figure 5:
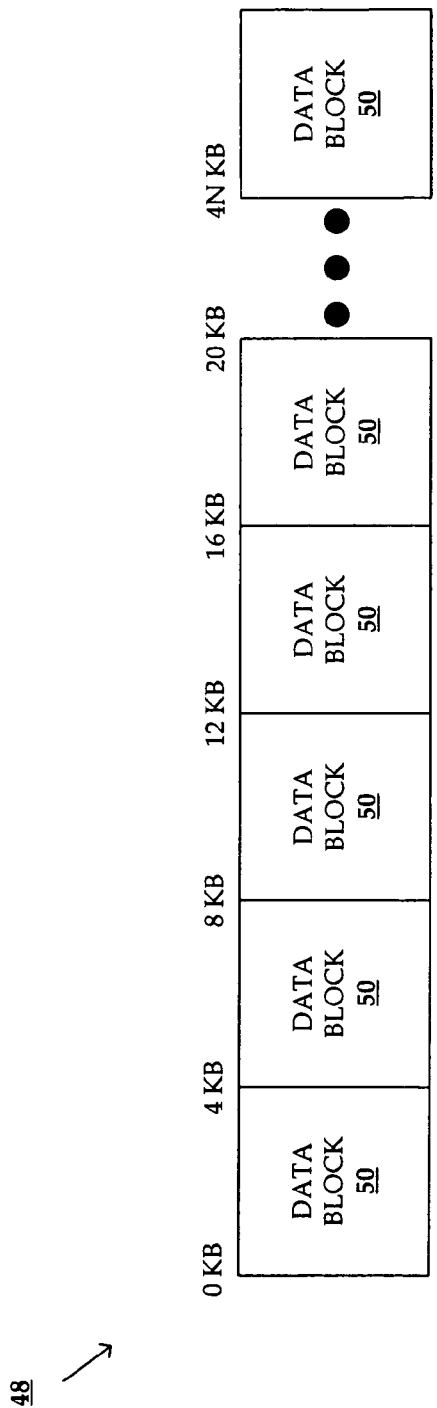
FIG. 5 illustrates the data blocks of a logical data entity, such as a file, according to an embodiment of the invention.

As previously mentioned, each logical data entity (e.g., file, volume or LUN) sent to the storage system 12 for storage may be broken up into data blocks. The process of placing data into blocks is often called "blocking". As used herein, the term "block" can mean any chunk of data which the file system 36 is capable of recognizing and manipulating as a distinct entity. Referring to FIG. 5, a file 48 sent to the storage system 12 for storage may be broken up by the file system 36 into, for example, 4 Kbyte data blocks 50, which may then be stored in a "stripe" spread across multiple disks in the storage subsystem 14 (e.g. a RAID array), as previously suggested. While in this description, a block is described as being a 4 Kbyte chunk, in other embodiments of the invention a block may have a different size. A data block is not to be confused with a disk block, which is the physical medium on which a data block is stored. Accordingly, each disk block may have an associated disk block number or address. The storage of the data blocks of the file 48 in memory may be internally represented by a buffer tree, such as the one shown in FIG. 6.

Figure 6:
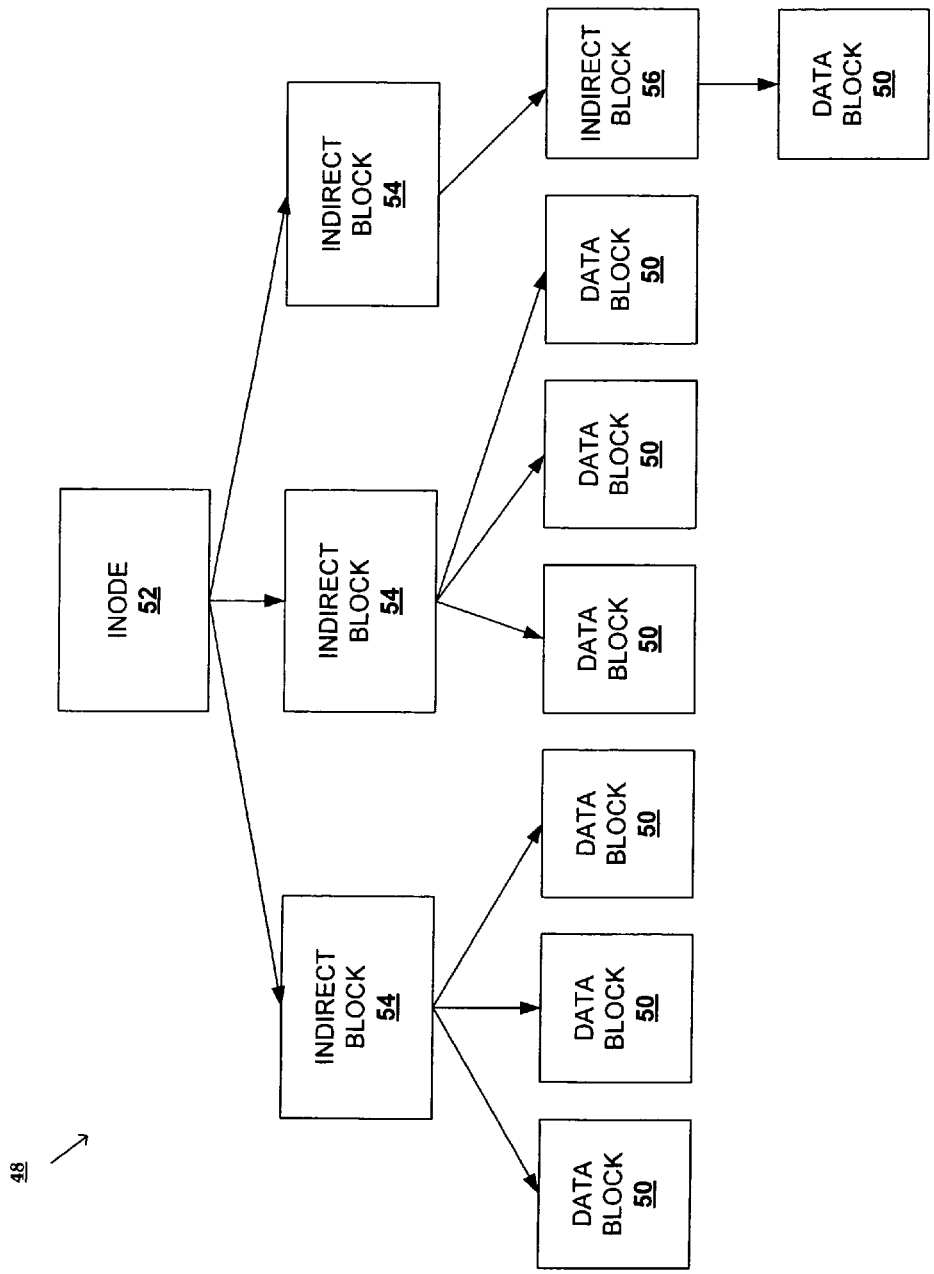
FIG. 6 illustrates a hierarchical tree of data blocks representing a file, according to an embodiment of the invention.

In FIG. 6, the buffer tree comprises a top-level inode 52. An inode is a data structure (stored in an inode file) that includes metadata for the file, such as ownership information, size, file type, and points to the blocks of the file. Normally, each stored file is represented by a corresponding inode.

A data block can be referenced directly by an inode. More commonly, however, a particular data block is referenced by an inode 52 indirectly, rather than directly. For example, for a large file (e.g. greater than 64 kB of data), each pointer in the inode 52 may reference an indirect block 54. An indirect block 54 is a block which, rather than containing actual file data, points to another block. For example, in FIG. 6, the inode 52 points to an indirect block 54, which points to the actual data block 50 or to another indirect block 56. Each pointer in the indirect block (e.g. indirect block 54 or 56) may store a value identifying a physical location of a data block 50. Every data block in a file may be referenced in this way from the inode. As the actual data blocks that make up the file are at the very bottom of the tree, it is conventional to refer to these blocks as Level 0 blocks. Accordingly, the indirect blocks that are one level higher in the tree are often referred to as Level 1 blocks.

Figure 7:
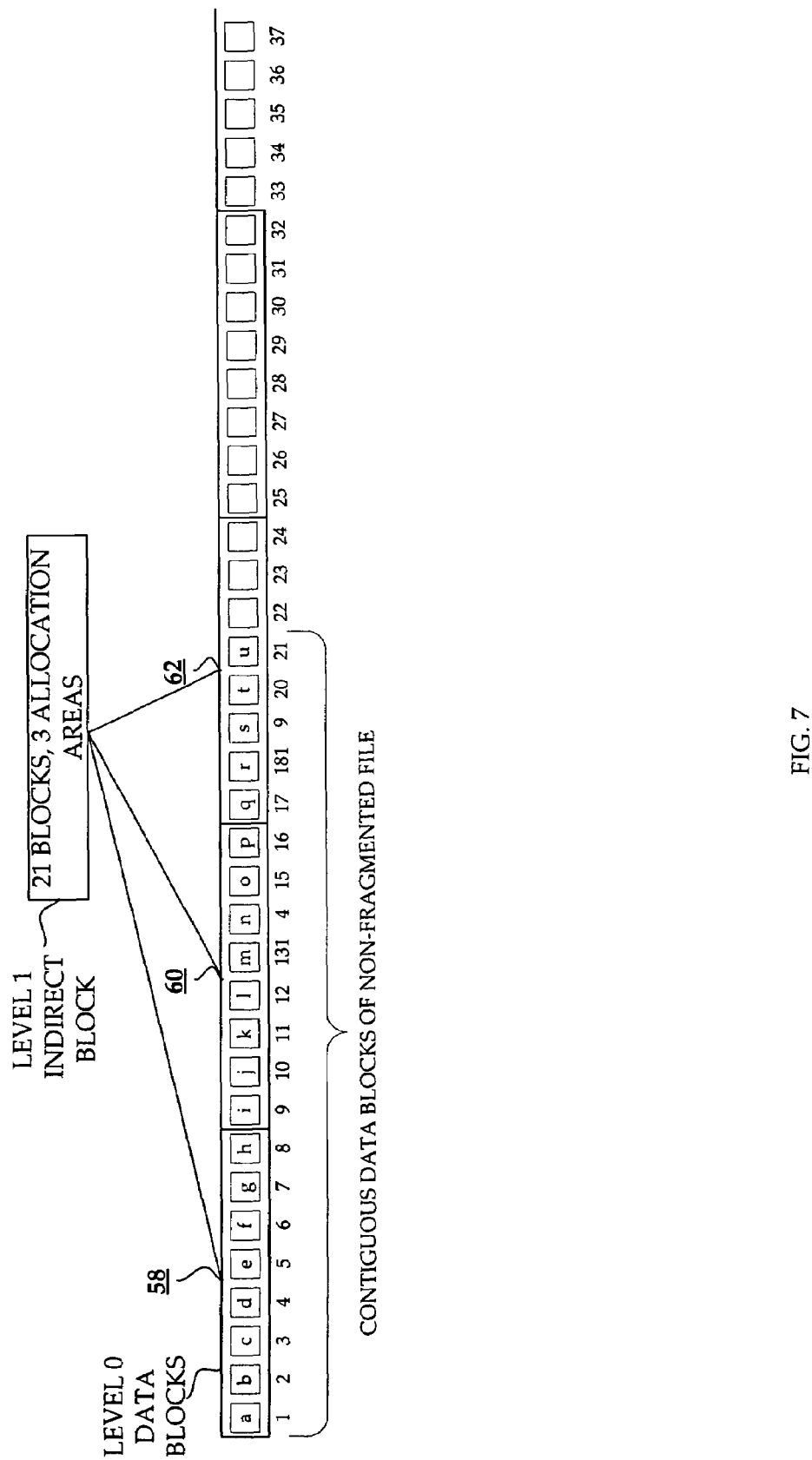
FIG. 7 illustrates an example of how the contiguous data blocks that make up a file may be stored when initially written to a mass storage device, according to an embodiment of the invention.

FIG. 7 illustrates an example of how the contiguous data blocks that make up a file may be stored when initially written to disk, according to an embodiment of the invention. As illustrated in FIG. 7, a contiguous group of twenty-one data blocks (e.g., data blocks "a", "b" . . . "u") represents a non-fragmented file. In addition, the data blocks are organized in allocation areas (e.g., allocation areas 58, 60 and 62), sometimes referred to as extents. Each allocation area consists of eight disk blocks for storing eight data blocks. It will be appreciated by those skilled in the art that the actual number of disk blocks within a predefined allocation area (e.g., an extent) may vary depending upon the particular implementation.

Figure 8:
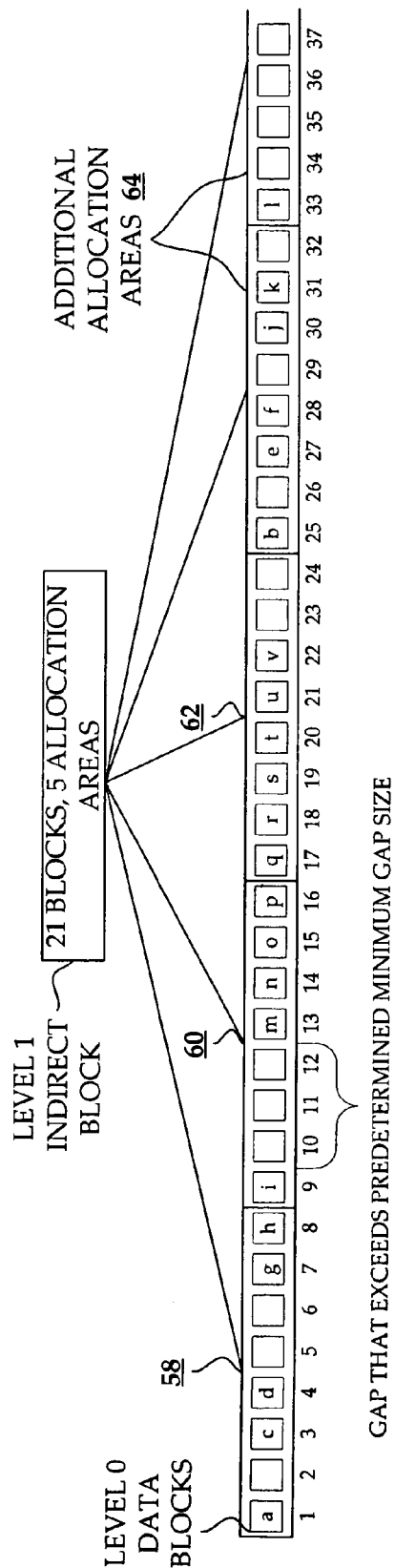
FIG. 8 illustrates the file shown in FIG. 7 after fragmentation has occurred.

In one embodiment of the invention, the algorithm for determining a fragmentation level for a particular logical data entity may be based entirely, or in part, on a comparison of the number of predefined allocation areas actually containing data blocks of the logical data entity and the minimum number of predefined allocation areas that would be required to store all the data blocks of the logical data entity if all of the data blocks were contiguous. For example, as illustrated in FIG. 7, the non-fragmented file (represented by the twenty-one data blocks spanning disk blocks 1-21) occupies space within three different allocation areas. In FIG. 8, the same file is shown after fragmentation has occurred. Accordingly, in FIG. 8, the file occupies two additional allocation areas 64, for a total of five allocation areas. In one embodiment, the fragmentation level associated with the file may be determined based on the ratio of the number of allocation areas actually containing data blocks of the file over the (theoretical) number of allocation areas required for the non-fragmented data blocks of the file. In a perfect scenario, the ratio will be equal to one (1.0). If fragmentation has occurred, however, the ratio will be greater than one.

In certain embodiments of the invention, the algorithm for determining a fragmentation level may also be based, at least in part, on the number of significant gaps within a single allocation area. Because one of the goals of defragmenting a file is to minimize the number of read operations required to read the file, not every gap within an allocation area is considered to be significant. This is because not every gap causes an additional read operation. For example, in allocation area 58 of FIG. 8, two spans of contiguous data blocks (e.g., block "a" and blocks "c" through "d") are separated by a single data block that is not part of the logical data entity (e.g., disk block 2). Accordingly, the storage system 12 may be able to issue a single read for disk blocks 1 through 4, and then reorganize the data blocks in memory 24, so that data blocks "a", "b" and "c" are contiguous. Such a read operation is referred to as a "dummy" read. However, in one embodiment of the invention, the actual size of the gap between segments of the logical data entity determines whether or not a dummy read is more efficient than two separate read operations. Consequently, whether data blocks are reallocated may depend upon the existence within a particular allocation area of a predetermined number of contiguous data blocks that are not associated with the logical data container. For example, in one embodiment of the invention, when each data block is 4 Kbytes, and an allocation area consists of 64 blocks, a dummy read is more efficient than two read operations only if the gap size is six blocks or less. In FIG. 8, the predetermined number of data blocks is three, and accordingly, the gap created by disk blocks 10, 11 and 12 is a significant gap. Consequently, the gap may contribute to the measure of the fragmentation level for the file. Moreover, in one embodiment, the decision to reallocate data blocks is based on the number of significant gaps. That is, data blocks within an allocation area will only be reallocated if the number of gaps larger than a predetermined size exceeds a predetermined number of gaps.

As described above, the defragmentation algorithm may proceed by first scanning the logical data entity to determine a fragmentation level. In one embodiment of the invention, the scanning operation may adjust to the user load on the storage system at any given moment. For example, when the user load is heavy, the scanning operation may be assigned a lower priority to free up storage system resources (e.g., CPU, memory, etc.) to process client initiated requests. Similarly, when the user load is light, the scanning operation may consume more of the storage system resources.

Figure 9A:
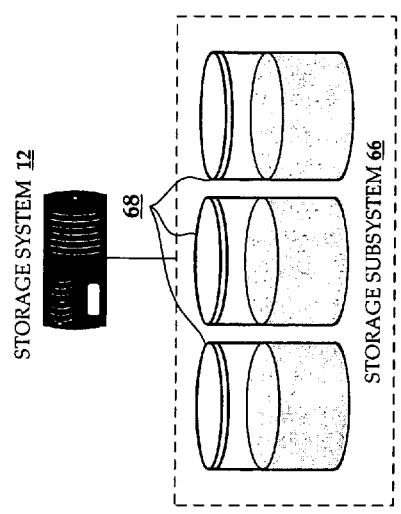
FIGS. 9A and 9B show an example of a storage system before and after additional mass storage devices have been added, and a reallocation operation has been performed, according to certain embodiments of the invention.
Figure 9B:
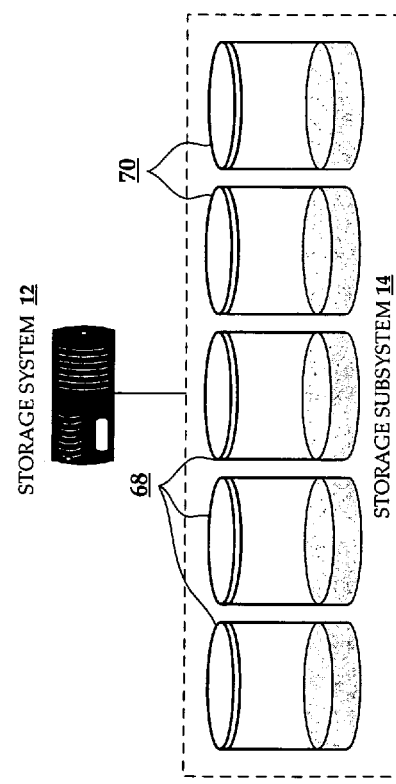

As described above, certain embodiments of the invention may implement a reallocation policy aimed at distributing data more evenly across newly added mass storage devices. FIG. 9A illustrates a method of reallocating the data blocks of a logical data entity, according to certain embodiments of the invention. As illustrated in FIG. 9A, the storage system 12 has a storage subsystem 66 with three mass storage devices 68. The data on the mass storage devices 68 is evenly distributed and generally non-fragmented. In FIG. 9B, two additional mass storage devices 70 have been added to the storage subsystem. and the defrag operation has been performed. After the defragmentation operation, the data blocks are evenly distributed across all five mass storage devices 68 and 70. Consequently, although the data blocks were not significantly fragmented (e.g., in FIG. 9A), the data blocks were reallocated to evenly distributed the data blocks across the newly added mass storage devices 70. Generally, this mode of operation will only be required for specific events, such as when additional mass storage devices are added to the storage subsystem.

Figure 10:
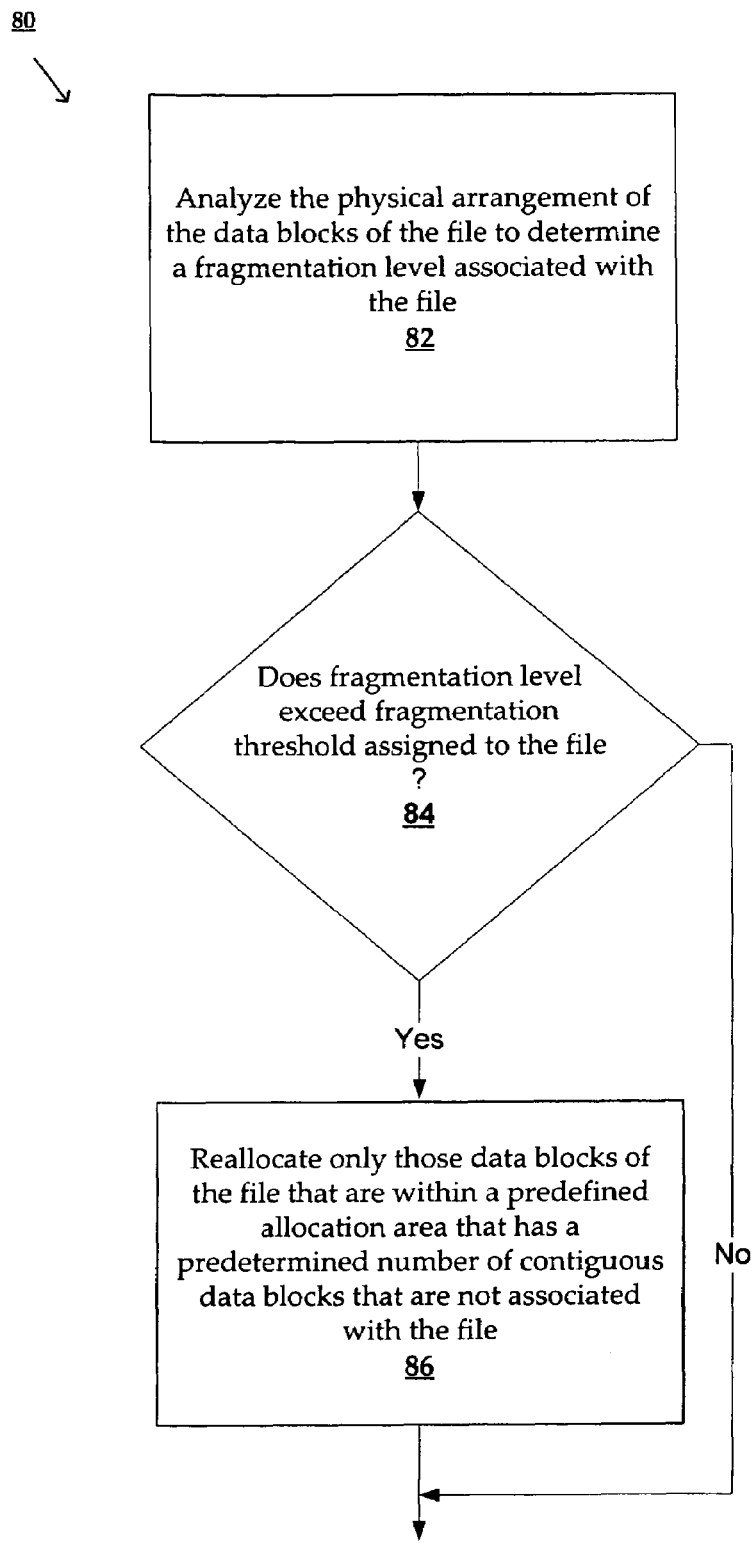
FIG. 10 illustrates a method of reallocating data blocks of a logical data entity according to one embodiment of the invention.

FIG. 10 illustrates a method 80 of reallocating data blocks of a file according to one embodiment of the invention. At operation 82, the physical arrangement of the data blocks for the file are analyzed to determine a fragmentation level associated with the file. For example, this may be accomplished by scanning the indirect blocks that contain pointers to the physical locations of the data blocks.

At operation 84, the fragmentation level associated with the file is compared to a fragmentation threshold previously assigned to the file. If the fragmentation level exceeds the fragmentation threshold assigned to the file, then at operation 86, only those data blocks of the logical data entity that are within a predefined allocation area that has a predetermined number of contiguous data blocks that are not associated with the file are reallocated.

Thus, a method and system for reallocating the data blocks of a logical data entity of a storage system have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method for reallocating data blocks in a logical data entity, the method comprising:
   analyzing a physical arrangement of the data blocks in the logical data entity to determine a fragmentation level associated with the logical data entity; and
   if the fragmentation level exceeds a fragmentation threshold associated with the logical data entity, then reallocating only those data blocks of the logical data entity that are within a predefined allocation area having a predetermined number of contiguous data blocks that are not associated with the logical data entity.

2. The method of claim 1, wherein the fragmentation level is determined, at least in part, based on a comparison of a number of predefined allocation areas actually containing data blocks of the logical data entity and a minimum number of predefined allocation areas that would be required to store all of the data blocks of the logical data entity if all of the data blocks of the logical data entity were contiguous.

3. The method of claim 2, wherein the fragmentation level is determined, at least in part, based on the number of gaps within a predetermined allocation area, wherein a gap is a predetermined number of contiguous data blocks that are not associated with the logical data entity.

4. The method of claim 1, wherein analyzing the physical arrangement of the data blocks to determine a fragmentation level associated with the logical data entity includes analyzing a meta-data block that contains meta-data associated with the logical data entity, the meta-data indicating the physical arrangement of the data blocks of the logical data entity.

5. The method of claim 4, wherein said analyzing occurs according to a user configurable schedule.

6. The method of claim 4, wherein said analyzing proceeds at a rate that is automatically and dynamically adjusted based on a level of user activity.

7. The method of claim 1, wherein the fragmentation threshold associated with the logical data entity is user-configurable via a user interface.

8. The method of claim 1, wherein the fragmentation threshold associated with the logical data entity is assigned to the logical data entity at the time the logical data entity is created.

9. The method of claim 1, wherein the fragmentation threshold associated with the logical data entity is assigned to the logical data entity at a time after the logical data entity is created.

10. The method of claim 1, wherein the logical data entity is an active entity managed by a write anywhere file system of a storage server.

11. The method of claim 1, wherein the logical data entity is a file, a volume or a LUN.

12. A storage system comprising:
   a file system to create and maintain a logical data entity to be stored as a plurality of data blocks on an array of storage devices and to service read and write requests received from one or more clients;
   a reallocation module to analyze the data blocks to determine a fragmentation level associated with the logical data entity, and to reallocate only those data blocks of the logical data entity that are within a predefined allocation area having a predetermined number of contiguous data blocks that are not associated with the logical data entity, if the fragmentation level exceeds a fragmentation threshold assigned to the logical data entity.

13. The storage system of claim 12, wherein the reallocation module is to determine the fragmentation level based, at least in part, on a comparison of a number of predefined allocation areas actually containing data blocks of the logical data entity and a minimum number of predefined allocation areas that would be required to store all the data blocks of the logical data entity if all of the data blocks were contiguous.

14. The storage system of claim 12, wherein the reallocation module is to determine the fragmentation level based, at least in part, on the number of gaps within a predetermined allocation area, wherein a gap is a predetermined number of contiguous data blocks that are not associated with the logical data entity.

15. The storage system of claim 12, wherein the reallocation module is to analyze a meta-data block that contains meta-data associated with the logical data entity, the meta-data indicating the physical arrangement of the data blocks of the logical data entity.

16. The storage system of claim 12, wherein the reallocation module is to facilitate setting the fragmentation threshold for one or more logical data entities.

17. A storage server comprising:
   a network interface through which to communicate data with one or more clients;
   a storage interface through which to communicate data with an array of storage devices;
   a processor; and
   a memory storing instructions which, when executed by the processor, cause the storage server to perform a set of operations, including:
      analyzing a physical arrangement of data blocks to determine a fragmentation level associated with the logical data entity; and
      if the fragmentation level associated with the logical data entity exceeds a fragmentation threshold assigned to the logical data entity, reallocating only those data blocks of the logical data entity that are within a predefined allocation area having a predetermined number of contiguous data blocks that are not associated with the logical data entity.

* * * * *